United States Patent

Nees et al.

[11] Patent Number: 5,785,376
[45] Date of Patent: Jul. 28, 1998

[54] VEHICLE DOOR BEAM

[75] Inventors: Rainer Bruno Nees; Clark Edwin Alatalo, both of Brighton, Mich.

[73] Assignee: Mascotech Tubular Products, Inc., Canton, Mich.

[21] Appl. No.: 639,012

[22] Filed: Apr. 24, 1996

Related U.S. Application Data

[60] Provisional application No. 60/000,374 Jun. 21, 1995.
[51] Int. Cl.$^6$ .................................................. B60J 5/04
[52] U.S. Cl. .......................... 296/146.6; 296/188; 49/502
[58] Field of Search ............................ 296/146.6, 188, 296/189; 280/751; 49/501, 502

[56] References Cited

U.S. PATENT DOCUMENTS

| | | |
|---|---|---|
| 2,775,324 | 12/1956 | Tate .................................. 52/731.2 |
| 4,013,317 | 3/1977 | Reidelbach et al. ................. 296/188 |
| 4,090,734 | 5/1978 | Inami et al. ...................... 296/146.6 |
| 4,684,166 | 8/1987 | Kanodia . |
| 4,708,390 | 11/1987 | Palentyn et al. . |
| 4,796,946 | 1/1989 | Wilson . |
| 4,861,097 | 8/1989 | Wycech . |
| 4,866,883 | 9/1989 | Brown et al. . |
| 4,919,473 | 4/1990 | Laimighofer et al. ......... 296/146.6 X |
| 4,948,196 | 8/1990 | Baba et al. . |
| 4,978,562 | 12/1990 | Wycech . |
| 5,056,861 | 10/1991 | Gardnweidner et al. . |
| 5,080,427 | 1/1992 | Sturrus et al. . |
| 5,085,485 | 2/1992 | Wurl . |
| 5,094,034 | 3/1992 | Freeman . |
| 5,123,694 | 6/1992 | DePierre et al. . |
| 5,124,186 | 6/1992 | Wycech . |
| 5,203,436 | 4/1993 | Wieting et al. . |
| 5,232,261 | 8/1993 | Kuroda et al. . |
| 5,277,469 | 1/1994 | Klippel . |
| 5,277,470 | 1/1994 | Freeman . |
| 5,370,437 | 12/1994 | Alberda . |
| 5,429,410 | 7/1995 | Fleischer . |

FOREIGN PATENT DOCUMENTS

| | | | |
|---|---|---|---|
| 3011345 | 10/1981 | Germany ........................ 296/188 |
| 50813 | 5/1981 | Japan ........................... 296/188 |
| 185317 | 10/1983 | Japan ......................... 296/146.6 |
| 492718 | 3/1992 | Japan . |
| 38992 | 2/1993 | Japan ......................... 296/146.6 |
| 6227254 | 8/1994 | Japan . |
| WO9420322 | 9/1994 | WIPO . |

*Primary Examiner*—Joseph D. Pape
*Attorney, Agent, or Firm*—Edgar A. Zarins; Malcolm L. Sutherland

[57] ABSTRACT

A stamped beam for a vehicle door with improved structural strength while minimizing added weight to the vehicle. The beam includes a corrugated beam body with integral end brackets for mounting the beam in the vehicle door. The beam body has a sinusoidal cross-sectional configuration with a longitudinal valley allowing the entire beam to be stamped from an integral metal blank forming the mounting brackets. For additional strength, a tubular center member is welded within the longitudinal valley. The tube acts as a tuning mechanism by altering the thickness of the tube wall according to the application of the beam.

4 Claims, 1 Drawing Sheet

VEHICLE DOOR BEAM

This application claims the benefit of U.S. Provisional Application No. 60/000,374 filed Jun. 21, 1995.

BACKGROUND OF THE INVENTION

I. Field of the Invention

The present invention relates to a door beam structural support for a vehicle door and, in particular, to a door beam with a stamped body with a corrugated mid-section incorporating a tubular center member for added support.

II. Description of the Prior Art

The primary concern for vehicle manufacturers is the safety of the passengers in a motor vehicle. However, since armor plating the vehicle is not feasible because of performance criteria, a balance must be found between reinforcing the vehicle body and overall weight of the vehicle. A structural feature which has proven to be an important component for passenger safety is the side door impact beam. This impact beam is mounted longitudinally within the interior of the doors of the vehicle to form a cage for absorbing collisions of the side doors. The beam is secured to the end walls of the door in order to absorb and deflect impact at the door. While impact resistance may be improved by including a large beam, a balance with the added weight must be struck.

Manufacturers have developed a wide variety of door beams in an attempt to reduce vehicle weight while improving impact absorption. Early beams were simple metal beams secured at their ends to the door structure. To improve structural strength, the configuration of the beam body has been altered or different materials were used in the manufacture of the beam. Corrugated and tubular bodies have been employed to improve strength. However, manufacturers continue their quest for a side impact beam which reduces vehicle weight while improving passenger safety.

SUMMARY OF THE PRESENT INVENTION

The present invention overcomes the disadvantages of the prior known door beams by providing a stamped beam which includes a corrugated center section and integral mounting brackets included as part of the stamping. A tubular center member is welded into the corrugated center section for added strength.

The door beam of the present invention includes a beam body which is stamped to form an integral component including a corrugated center beam section and end brackets or plates. The end brackets include apertures for fastening the beam to the structural frame of a vehicle door. The center section has a corrugated cross-sectional configuration with a longitudinal valley. The corrugated configuration provides structural strength while maintaining a narrow profile to fit within the confines of the vehicle door. The advantage of this design is that the end mounting brackets are already a part of the stamping. For additional strength, a tubular center member is welded within the axial valley of the stamping. The tube can be used as a tuning tube by altering the wall thickness of the tube to the application requirements. In a preferred embodiment, the tube is long enough to cover the center portion of the beam, approximately 12 to 16 inches.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
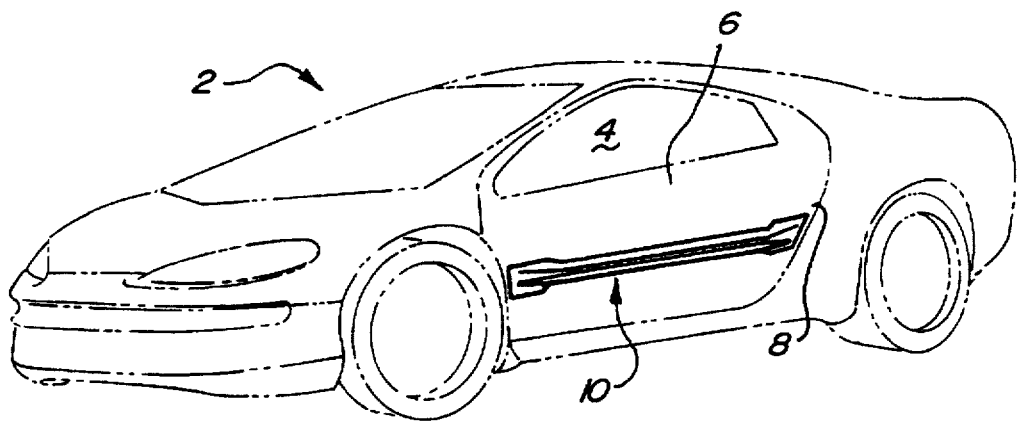
FIG. 1 is a perspective view of a vehicle having a door beam embodying the present invention.

Referring first to FIG. 1, there is shown a vehicle 2 with a passenger compartment 4 having at least one selectively operable passenger door 6. The passenger door 6 generally comprises a peripheral frame 8 to which a door beam 10 is attached, the Door beam 10 reinforces the structural strength of the door 6 forming a barrier across the door 6 against side impacts. The beam 10 is intended to absorb impacts in conjunction with the frame 8 of the door 6. Such side impact beams 10 provide a balance between impact resistance and vehicle performance by reducing the overall weight of the vehicle 2.

Figure 2:
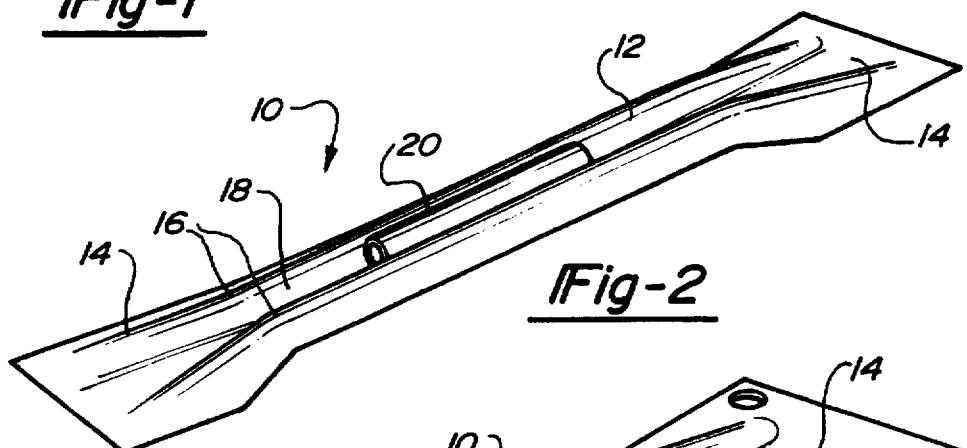
FIG. 2 is a perspective view of the door beam for a vehicle embodying the present invention.
Figure 3:
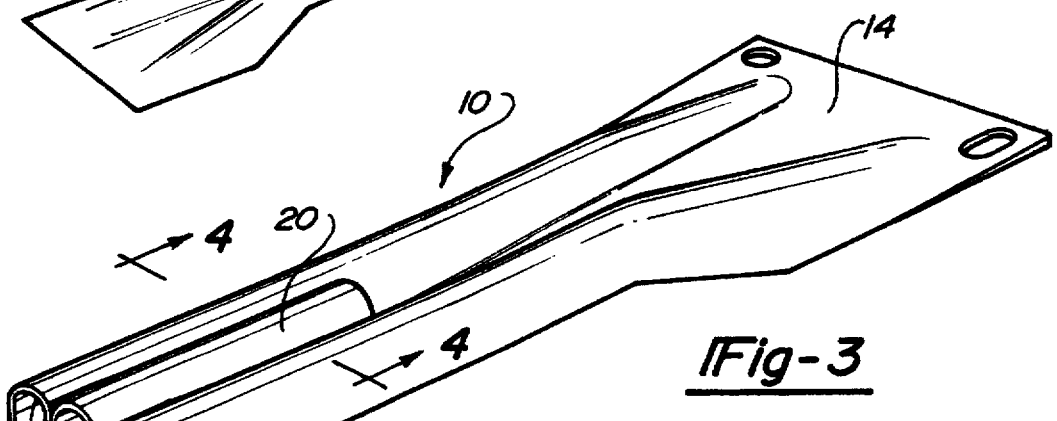
FIG. 3 is a partial enlarged view of one end of the door beam.
Figure 4:
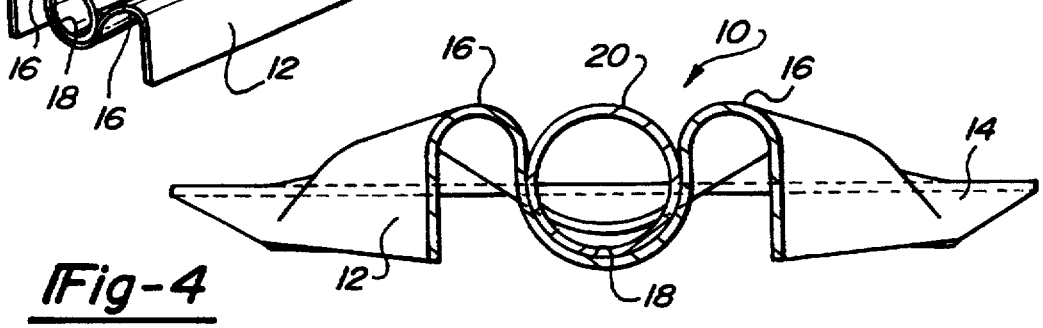
FIG. 4 is a cross-sectional end view of the door beam.

Referring now to FIGS. 2 through 4, the door beam 10 has an integral beam body 12 and end mounting flanges 14. The beam body 12 includes folds or corrugations 16 including a center longitudinal valley 18. Mounted within the longitudinal valley 18 is a tubular member 20 which adds strength to the beam 10. The length and wall thickness of the tube 20 can be altered to effectively tune the rigidity of the beam 10.

In a preferred process of manufacturing the door beam 10 of the present invention, the beam body 12 and flanges 14 are stamped as an integral component. Thereafter, the tubular member 20 is welded within the center region of the beam body 12.

The subject door beam 10 is a combination of a stamped component and a tube 20. The stamped component provides the body of the door beam. The center section of the stamping is configured as a modified U or W-shape, that has considerable strength and resistance against bending. The ends 14 of this stamped component represent the mounting surface which connects to the vehicle door 6. All holes or geometric shapes at these end brackets 14 are part of the stamped component and require no subsequent operations. This stamped part is preferably made from high strength material such as HSLA-80, Martinsite M-140 through M220 or similar materials.

The second component that complements the door beam is a tube 20 which is welded to the stamping. This tube 20 is made from HSLA-80, Martinsite M-140 through M220 or similar materials, and operates as a tuning element of the beam 10. As this basic design principle is used for several different door beam applications, the tube wall thickness, length and diameter can be adjusted ("tuned") to meet each specific vehicle requirement, while the basic stamped configuration remains the same or similar. The tube 20 adds energy absorption capability and strength to the center section of the door beam 10. The tube 20 is GMAW (Gas Metal Arc Welding) welded to the stamping 12.

Specific benefits of the beam 10 include:

a. Lightweight construction using thin high strength materials for optimized weight/performance ratio, and minimum weight increase of the vehicle.

b. Ease of manufacturing due to stamped design with added tube. Simple assembly weld operation.

c. As a hybrid design, it takes advantage and incorporates the benefits of both, the stamped door beam concept and the tubular door beam concept.

d. Low cost design, due to ease of manufacturing and minimized used of raw material.

e. Good energy absorption characteristics and high performance due to the combination of a tube and a stamping with a geometric shape.

These advantages are realized by combining the tube 20 into the sinusoidal or corrugated body 12 of the beam 10. Additional cost advantages are realized by integrally stamping the mounting flanges 14 with the beam body 12 eliminating subsequent manufacturing steps. The sinusoidal waves 16 taper into the substantially planar end brackets 14 facilitating mounting to the door frame 8 yet extending the strength advantages of the corrugated beam body 12. The corrugations or waves 16 of the body 12 provide improved energy absorption. Add to this integral body the tubular member 20, which can be varied according to the required energy absorption, and an efficient yet lightweight vehicle component is produced.

The foregoing detailed description has been given for clearness of understanding only and no unnecessary limitations should be understood therefrom as some modifications will be obvious to those skilled in the art without departing from the scope and spirit of the appended claims.

What is claimed is:

1. An impact absorption beam adapted to be mounted within a door of a vehicle, said beam comprising:

an elongated beam body with end mounting flanges integrally formed therewith for securing said beam to the vehicle door, said beam body having a substantially sinusoidal cross-sectional configuration with a central longitudinal channel extending the length of said beam body, said sinusoidal configuration of said beam body tapering in height to said integral mounting flanges; and a tubular member mounted within said central longitudinal channel of said beam body to reinforce said beam, said tubular member having predetermined dimensions according to the desired impact absorption characteristics of said beam.

2. The beam as defined in claim 1 wherein said predetermined dimensions of said tubular member for the desired impact absorption characteristics of said beam include length, diameter and wall thickness of said tubular member.

3. The beam as defined in claim 2 wherein said end mounting flanges integrally formed with said beam body have a substantially planar configuration, said sinusoidal configuration of said beam body reducing in height tapering outwardly to said planar end flanges thereby forming a continuous beam from said beam body to said end flanges.

4. An impact absorption beam adapted to be mounted within a door of a vehicle, said beam comprising a one-piece elongated beam body with end mounting flanges integrally formed therewith for securing said beam to the vehicle door, said beam body having a substantially sinusoidal cross-sectional configuration tapering from a first height along a majority of said beam body outwardly to substantially planar end mounting flanges, said beam body having a central longitudinal channel; and a tubular member mounted within said central longitudinal channel of said beam body to reinforce said beam, said tubular member having predetermined dimensions according to desired impact absorption characteristics of said beam.

* * * * *